United States Patent [19]

Hasegawa et al.

[11] Patent Number: 4,648,122
[45] Date of Patent: Mar. 3, 1987

[54] COMMUNITY ANTENNA TELEVISION COMMUNICATION SYSTEM

[75] Inventors: Yonosuke Hasegawa; Tokiharu Ando, both of Tokyo, Japan

[73] Assignee: Pioneer Electronic Corporation, Tokyo, Japan

[21] Appl. No.: 777,810

[22] Filed: Sep. 19, 1985

[30] Foreign Application Priority Data

Sep. 19, 1984 [JP] Japan ................................ 59-197629

[51] Int. Cl.⁴ .............................................. H04H 1/02
[52] U.S. Cl. ...................................... 358/86; 358/349; 455/6; 380/20
[58] Field of Search .......................... 358/86, 114–124; 455/2, 3, 4, 6, 26, 31, 34, 38; 364/513

[56] References Cited
U.S. PATENT DOCUMENTS
4,135,157  1/1979  den Toonder ........................... 455/6

Primary Examiner—Russell E. Adams
Attorney, Agent, or Firm—Sughrue, Mion, Zinn, Macpeak and Seas

[57] ABSTRACT

A CATV system in which first and second terminal units are provided, connected in series via a transmission line, whereby the first transmission unit effects communiction with a control center while the second terminal unit controls channel selection for associated terminal units. In order to perform data communication, priority is determined between the first and second terminal units such that the second terminal unit is set in a stand-by state when the first terminal unit is in a busy state in which the first terminal unit communicates with the center, while the second terminal unit sends upward data to the first terminal unit in a state in which the first terminal unit requests upward data communication to the second terminal unit.

4 Claims, 6 Drawing Figures

S: START BIT
P: STOP BIT

COMMUNITY ANTENNA TELEVISION COMMUNICATION SYSTEM

BACKGROUND OF THE INVENTION

The present invention relates to a community antenna television (CATV) communication system in which data communication is performed between a center and subscribers' terminal.

In a CATV system of this type, as shown in FIG. 1, a TV signal from a center is received at a subscriber port from a trunk through a branding device 100 and sent to a TV set 108 through a terminal unit 101. A downward data signal multiplexed onto the TV signal is separated from the latter through a filter 102 in the terminal unit 101, demodulated by a demodulator 105, and supplied to a controller 106 in which judgement is made as to whether a selection channel supplied from a remote controller 107 is a permitted one or not in accordance with an address of the downward data signal. Thereafter, the controller 106 causes a TV tuner 103 to operate through a PLL circuit 104 so that a TV signal input to the TV set 108 is selected.

In this case, a data communication signal for controlling reception is normally supplied from the center by a polling system. In this system, the controller 106 must respond to the data communication signal with the highest priority. Data entered through a key operation by the remote controller 107 is sent out from the terminal unit 101 to the center during polling.

Here, a problem arises in that many functions and fast response times in order to respond to the polling from the center side are required for the controller in each terminal. Therefore, the cost of each terminal is considerably high. Further, there is a disadvantage that the terminals must have individual addresses because polling is performed between the center and each terminal, and hence the time taken for polling becomes longer as the number of the terminals increases. Moreover, there is a further problem in that wire tapping reception may be performed by merely copying the design of any terminal.

There has been proposed a distribution unit system in which channel-selection control for the terminals is performed at a distribution portion. In a controller used in the distribution unit system, however, a function of performing data communication with the center, a function of electronically selecting a channel and controlling the channel selection, and a function of performing data communication with the remote controller must be provided, and it is necessary to respond to each data communication request generated at random. Therefore, not only is the complex controller exceedingly expensive in view of the construction thereof, but also there is a possibility that the terminal may be copied or damaged for the purpose of wire tapping reception because a tuner for selecting a TV signal and a controller for performing reception control are provided in the terminal of each subscriber port.

SUMMARY OF THE INVENTION

An object of the present invention is therefore to eliminate the disadvantages of the conventional CATV communication system described above.

Another object of the present invention to provide a CATV communication system in which the internal construction of each terminal set is simplified such that data communication with the center is mainly performed in a first terminal unit in which control of channel selection or the like is performed, while a second terminal unit performs upward data communication with the first terminal unit.

In order to attain the objects as described above, according to the present invention, a CATV communication system for performing data communication between a center and each of a plurality of terminals is provided in which each terminal is constituted by a series connection of a first and a second terminal unit connected to a transmission line, the first and second terminal units being arranged such that, in order to perform data communication, priority is determined between the first and second terminal units such that the second terminal unit is made to be in a stand-by state when the first terminal unit is in a busy state where the first terminal unit communicates with the center, while the second terminal units sends upward data to the first terminal unit in the state where the first terminal unit requests upward data communication to the second terminal unit. Further, channel-selection control is performed in the first terminal unit.

The above and other objects, features and advantages of the present invention will be more apparent from the following detailed description taken in conjunction with the accompanying drawings.

DESCRIPTION OF THE PREFERRED EMBODIMENTS

Figure 1:
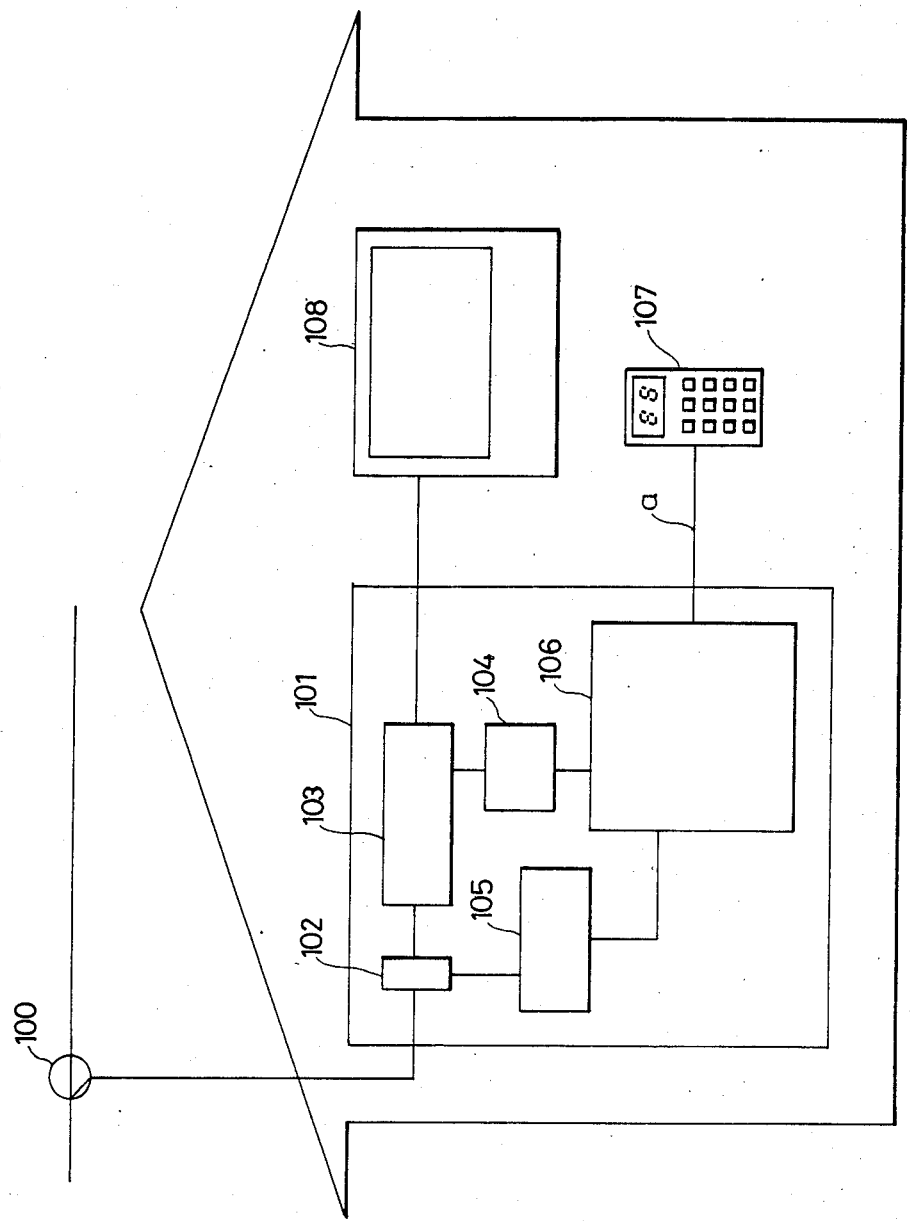
FIG. 1 is a block diagram showing an example of a conventional CATV communication system.
Figure 2:
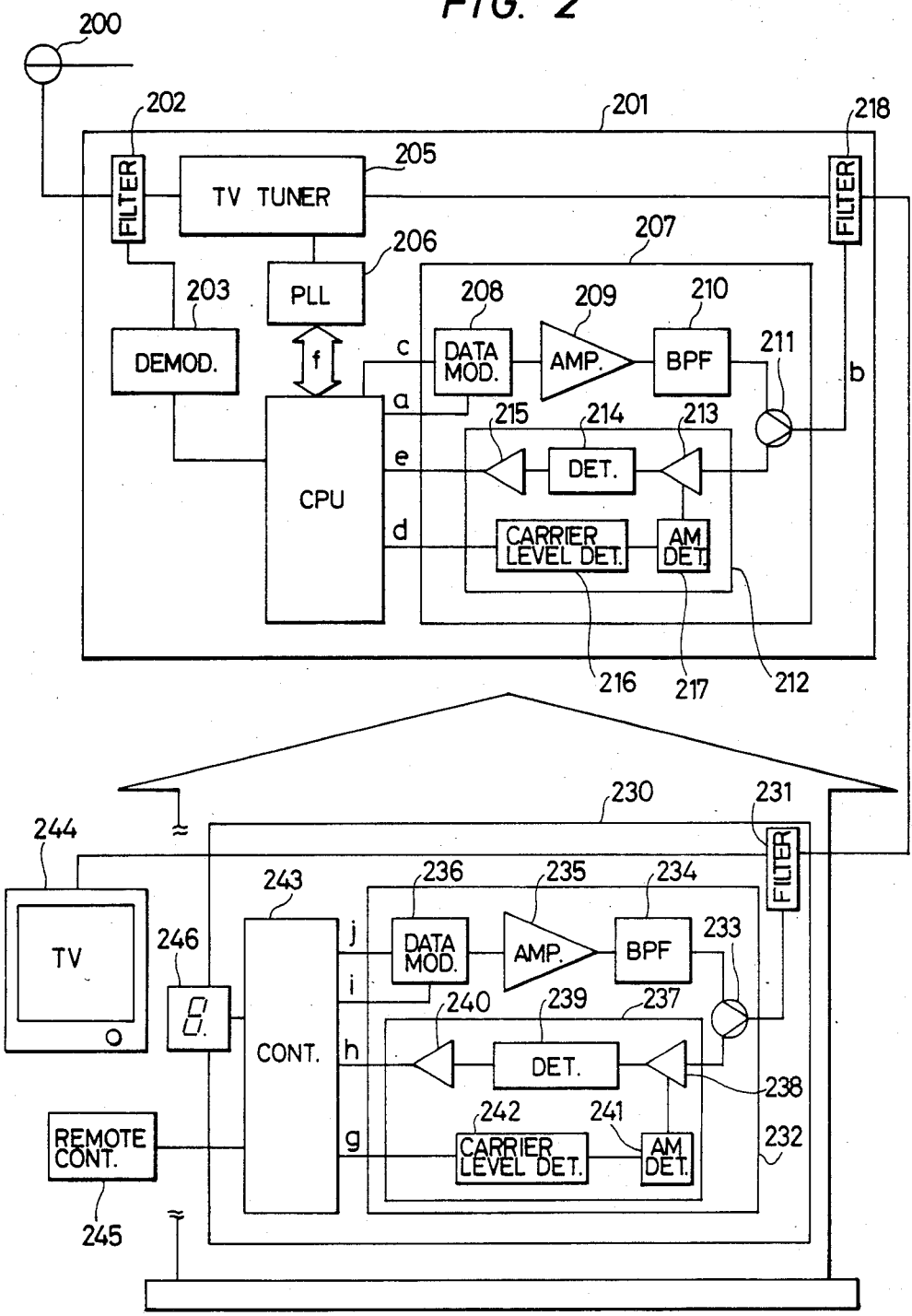
FIG. 2 is a block diagram showing a preferred embodiment of a CATV system constructed according to the present invention.

Referring to FIGS. 2 to 6, a preferred embodiment of the CATV communication system according to the present invention will be specifically described hereunder.

In the drawing, there are provided a first terminal unit 201 located outdoors and a second terminal unit 230 connected in series with the first terminal unit 201 and located within a subscriber port. Both these units are being connected to a center through a single transmission line.

A TV signal is supplied to the first terminal unit 201 from a trunk through a branching device 200. In the first terminal unit 201, the TV signal and downward data signal multiplexed thereon are separated from each other through a filter 202. Then, a desired TV channel signal is selected by a TV tuner 205 and transferred to the second terminal unit 230 through a branching filter 218. The downward data signal, on the other hand, is demodulated through a demodulator 203 and supplied to a CPU (central processing unit) 204 in which the content of the selection of the subscriber port is detected on the basis of an upward data signal taken from the second terminal unit 230 through a transceiver 207, and judgement is made as to whether the selection content relates to a previously registered authorized channel or not. The CPU 204 drives a PLL circuit 206 to cause the TV tuner 205 to perform channel selection.

The transceiver 207 is constituted by a transmitter section and a receiver section 212, the former including a data modulation section 208 for FM-modulating data, an amplifier 209 for amplifying a modulated signal, and a bandpass filter 210, while the latter is constituted by an amplifier 213 for amplifying a received signal, a detector section 214, an amplifier 215 for amplifying a detected output, an AM detector section 217, and a carrier level detecting section 216. The transceiver 207 is connected to a branching filter 218 through a distributor 211.

Further, the second terminal unit 230 is provided with a transceiver 232 having the same construction as that of the first terminal unit 210. The TV signal from the first terminal unit 201 is directly supplied to a TV set 244 through a branching filter 231, while a status signal from the first terminal unit 201 is branched so as to be supplied to the transceiver 232. In a receiver section 237 of the transceiver 232, the input signal is transferred to an amplifier section 238 through a distributor 233 so as to be amplified therein, detected in a detector section 239, further amplified by an amplifier 240, and then supplied to a controller 243. The carrier of the input signal, on the other hand, is detected in an AM detector section 241, and the carrier level is detected in a carrier level detecting section 242 and the detected signal supplied to the controller 243. A key operation input from a remote controller 245 of the subscriber port is supplied to the controller 243. Under the control of the controller 243, the upward data signal is modulated in a data modulation section 236 and amplified by an amplifier 235, the output of which is in turn transferred to the first terminal unit 201 through a bandpass filter 234 and the distributor 233.

Figure 3:
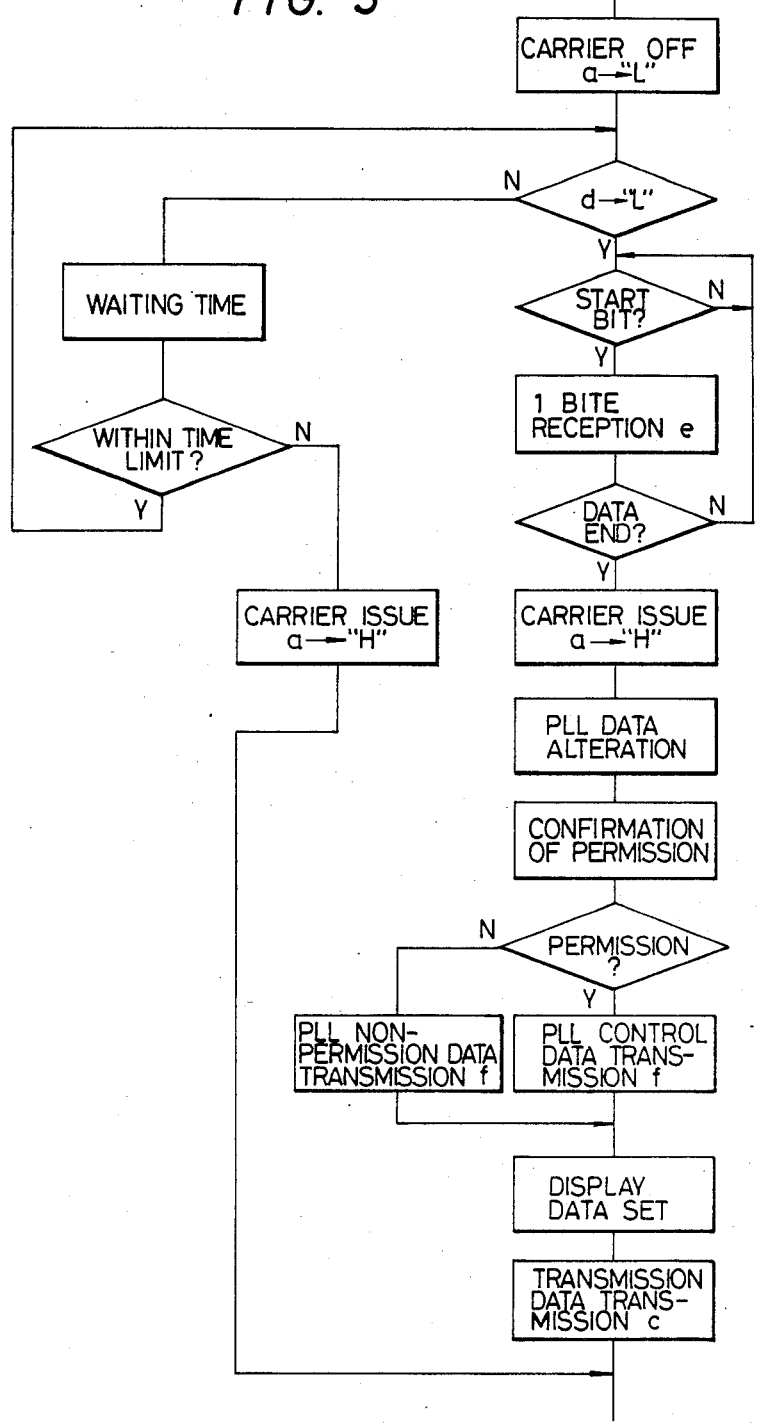
FIG. 3 is a flowchart showing a communication protocol of a first terminal unit.
Figure 4:
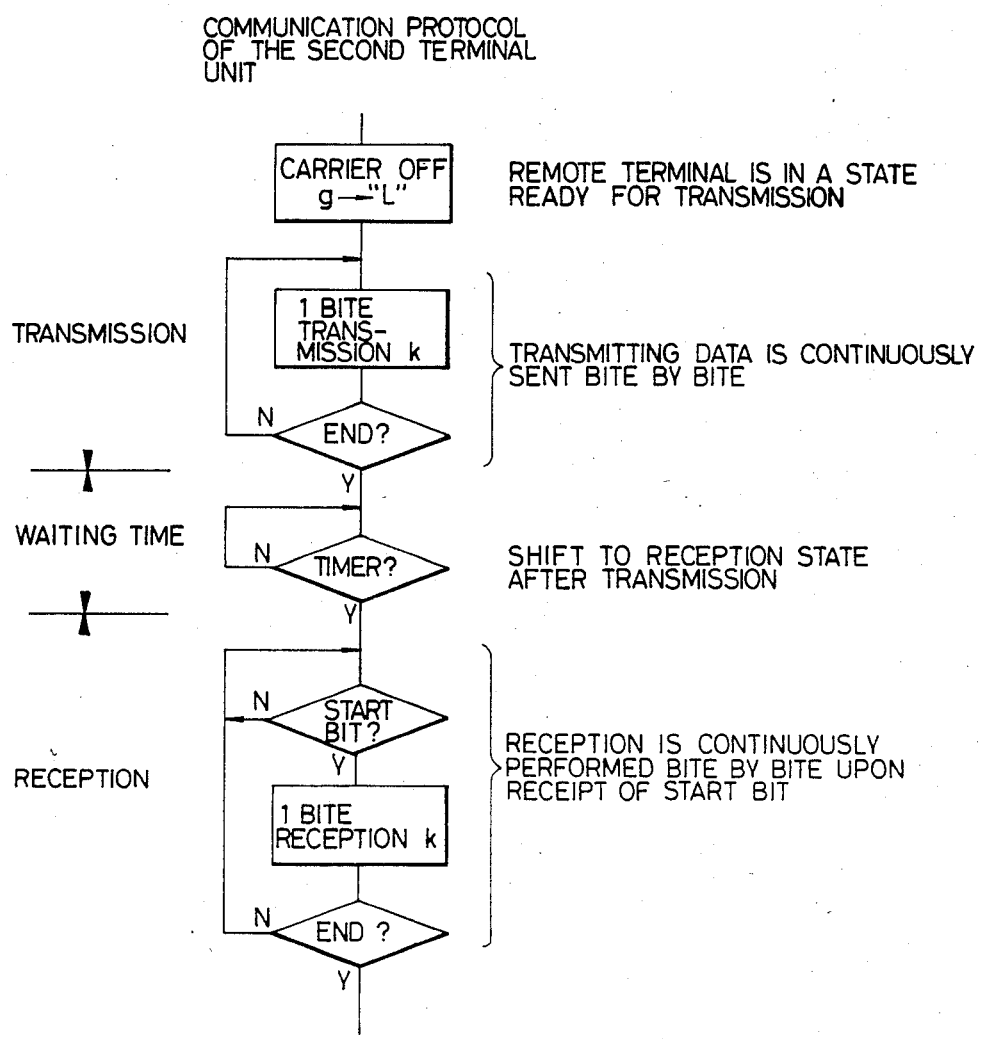
FIG. 4 is a flowchart showing a communication protocol of a second terminal unit.
Figure 5:
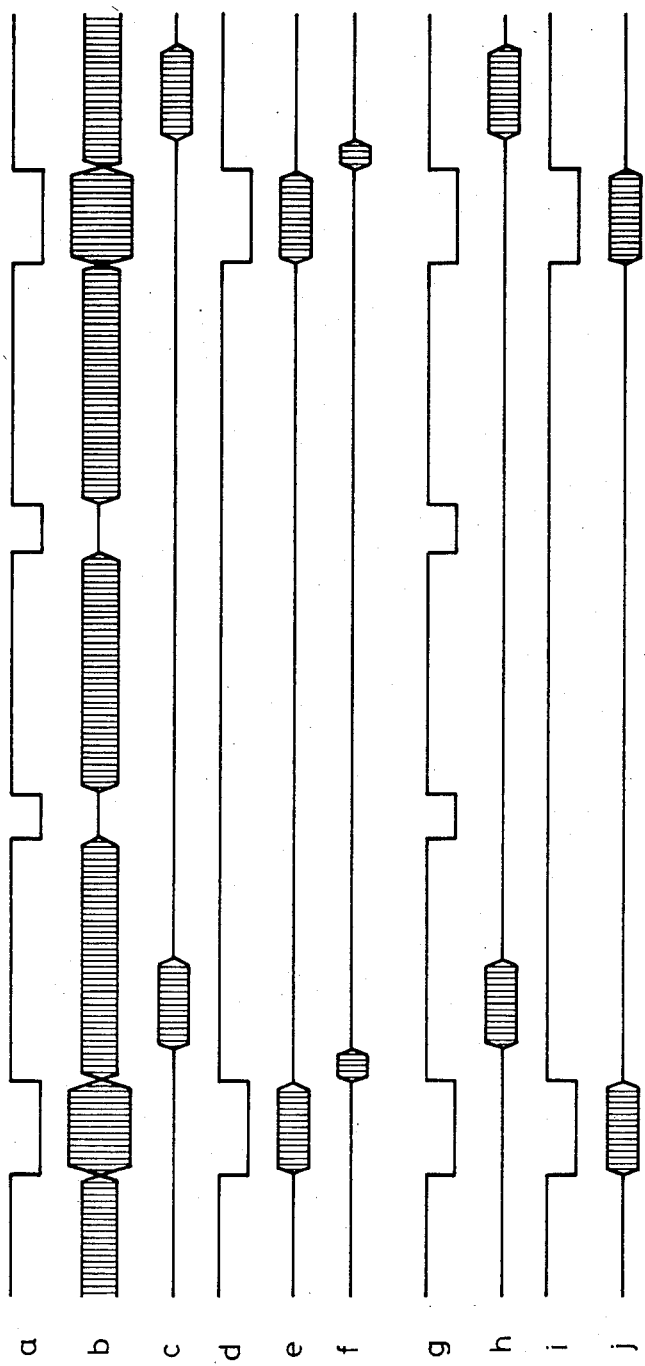
FIG. 5 is a diagram showing respective signal formats of various portions.
Figure 6:
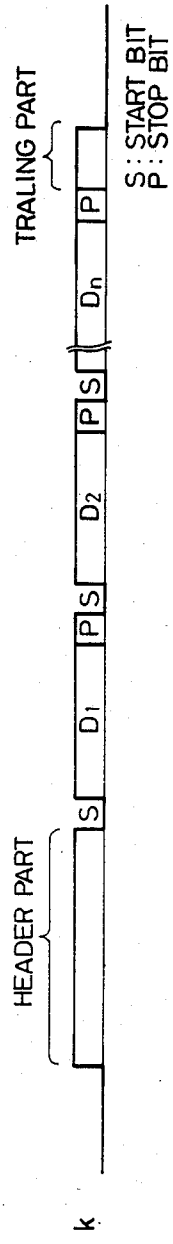
FIG. 6 is a diagram showing a format of communication data.

Communication protocols of the first and second termnal units 201 and 230 are as shown in FIGS. 3 and 4. FIG. 5 shows respective signals at various sections and relates to the communication between the first and second terminal units. FIG. 6 shows the format of communication data.

In the CPU 204 of the first terminal unit 201, a signal a to be transferred to the data modulation section 208 is set to L (low level) in order to apply "a request to send" signal to the second terminal unit 230 in the case where it is not in a busy state in which a response to the data communication with the center, electronic channel-selection control, or the like, is being performed. Further, at that time, the content of the data communication sent to the data modulation section 208 is not synchronized but is provided with a data portion having a start and a stop bit at a front and a rear portion of the data (see FIG. 6). Thus, it is possible to interrupt the carrier in the data modulation section 208.

In the case where a signal d of the carrier level detecting section 216 is at the L level, that is, when a carrier signal is produced from the second terminal unit 230, a signal e, the data format of which is shown in FIG. 6, is read by the CPU 204. Reading a start bit of the data, the CPU 204 reads the data bit by bit successively. Upon completion of reading a predetermined number of head portions, the CPU 204 changes over the level of the signal a to the data modulation section 208 to H in order to terminate the transmission from the second terminal unit 230. Then, a carrier is generated by the data modulation section 208.

Next, in the CPU 204, the channel selection data sent from the second terminal unit 230 is processed so as to judge whether the channel selection data is related to an authorized program or not, and if yes, PLL controlling data is sent to the PLL circuit 206, while if no, unauthorized data is sent thereto (a signal f) and a data signal c is also sent to the data modulation section 208.

The second terminal unit 230, on the other hand, immediately is set in a tramsmission state when no transmission from the first terminal unit 201 is performed after the carrier from the first terminal unit 201 has been interrupted, that is, if an output signal g of the carrier level detecting section 242 does not become L after a predetermined time has elapsed.

Further, in the second terminal unit 230, when the transmission to the first terminal unit 201 becomes necessary, for example, when a viewer operates the remote controller 245 to select a reception channel, the controller 243 is operated such that, in a step where the output signal g of the carrier level detecting section 242 is L, the existence of "a request to sent" signal from the first terminal unit 201 is detected, and a carrier (a signal i) is produced to transfer the transmission data (signal j) to the data modulation section 236. The carrier i is interrupted after the data has been transmitted and the second terminal unit 230 is set in the reception state after a predetermined time has elapsed. In the second terminal unit 230, the signal c sent out from the first terminal unit 201 is received as a display data signal h so as to be displayed by a channel display section 246.

Although "a request to send" signal from the first terminal unit 201 to the second terminal unit 230 is performed by interrupting a carrier in the embodiment described above, it may, alternatively, be performed by generating a carrier.

Further, although data communication is performed using a frequency shift keying (FSK) communication system in the embodiment described above, it may be done with a phase shift keying (PSK) communication system.

Moreover, alternatively, data communication may be performed using a baseband communication system by using the change in level of the "request to send" signal from H to L or, the reverse thereof.

Further, although the distributors 211 and 233 are used in the embodiment as described above, however, in order to increase the isolation between the transmitter and receiver sections, an intermittent carrier system may be employed by using changeover switches in place of the distributions 211 and 233.

As described above in detail, according to the present invention, data communication between the first terminal unit and the center has priority, channel-selection control is performed in the first terminal unit, and upward data communication is performed between the first and second terminal units. Therefore, not only is the second terminal unit provided in the subscriber port rendered quite inexpensive, but also it is possible to perform data communication using a simple communication protocol. Further, the TV tuner, the PLL circuit, and the controller section for performing channel selection can be separated from the subscriber port.

We claim:

1. In a CATV system comprising a center and a plurality of terminals coupled to said center and in which bidirectional communiccations is carried out between said center and each of said terminals over transmission lines, the improvement wherein each of said terminals comprises: a first terminal unit and a second terminal unit, said first terminal unit being coupled to said center via said transmission lines, said first terminal unit comprising means for carrying out bidirectional communications with said center via said transmission lines, said first terminal unit further comprising channel selection means for passing to said second terminal unit a channel signal selected at said second terminal unit, each of said first and second terminal units comprising bidirectional transceiver means, said transceiver means of each of said first and second terminal units being serially coupled to one another for carrying out bidirectional communications between said first and second terminal units, and each of said first and second terminal units comprising controller means for establishing a communications protocol between said first and second terminal units whereby said second terminal unit is placed in a stand-by state when said first terminal unit is in a busy state where said first terminal unit is communicating with said center, while said second terminal unit transmits upward data to said first terminal unit in a state where said first terminal unit requests upward data communication to said second terminal unit, said upward data including channel selection data for selecting a channel signal passed to said second terminal unit from said channel selection means in said first terminal unit.

2. The CATV system of claim 1, wherein said transceivers of said first and second terminal units each comprise means for transmitting a carrier signal therebetween and means for detecting a carrier signal level of the received carrier signal, and wherein at least one of said controller means comprises means for establishing a carrier signal level of said carrier in accordance with said communications protocol.

3. The CATV system of claim 1, wherein said first terminal unit is located outside of a subscriber's premises and said second terminal unit is located inside of said subscriber's premises.

4. The CATV system of claim 1, wherein said bidirectional transceiver means of said first and second terminal units are substantially identical to one another.

* * * * *